US008577526B2

(12) United States Patent
Jinno et al.

(10) Patent No.: US 8,577,526 B2
(45) Date of Patent: Nov. 5, 2013

(54) VEHICLE AND CONTROL METHOD THEREOF

(75) Inventors: Kunihiko Jinno, Toyota (JP); Tadashi Nakagawa, Aichi-ken (JP); Masahiko Maeda, Nagoya (JP); Hideaki Yaguchi, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 976 days.

(21) Appl. No.: 12/523,281

(22) PCT Filed: Dec. 12, 2007

(86) PCT No.: PCT/JP2007/073932
§ 371 (c)(1),
(2), (4) Date: Jul. 15, 2009

(87) PCT Pub. No.: WO2008/087811
PCT Pub. Date: Jul. 24, 2008

(65) Prior Publication Data
US 2010/0082190 A1 Apr. 1, 2010

(30) Foreign Application Priority Data
Jan. 16, 2007 (JP) ................................. 2007-007209

(51) Int. Cl.
*B60G 9/00* (2006.01)
(52) U.S. Cl.
USPC ............... 701/22; 701/36; 701/123; 340/438; 340/439
(58) Field of Classification Search
None
See application file for complete search history.

(56) References Cited

U.S. PATENT DOCUMENTS

| | | | | |
|---|---|---|---|---|
| 5,343,970 A | * | 9/1994 | Severinsky | 180/65.25 |
| 5,383,431 A | | 1/1995 | Nishimura et al. | |
| 5,623,194 A | * | 4/1997 | Boll et al. | 320/137 |
| 5,693,876 A | * | 12/1997 | Ghitea et al. | 73/114.53 |
| 5,776,031 A | * | 7/1998 | Minowa et al. | 477/155 |
| 5,841,201 A | * | 11/1998 | Tabata et al. | 290/40 C |
| 5,887,670 A | * | 3/1999 | Tabata et al. | 180/65.25 |
| 5,982,045 A | * | 11/1999 | Tabata et al. | 290/17 |
| 6,092,021 A | * | 7/2000 | Ehlbeck et al. | 701/123 |
| 6,278,915 B1 | * | 8/2001 | Deguchi et al. | 701/22 |
| 6,304,809 B1 | * | 10/2001 | Cullen et al. | 701/93 |

(Continued)

FOREIGN PATENT DOCUMENTS

CN 1824556 A 8/2006
JP 62-30940 A 11/1983

(Continued)

OTHER PUBLICATIONS

Extended European Search Report (EESR) for corresponding European Patent Application No. 07850483 dated Feb. 21, 2011.

*Primary Examiner* — Jonathan M Dager
(74) *Attorney, Agent, or Firm* — Sughrue Mion, PLLC

(57) ABSTRACT

In a hybrid vehicle 20, when the ECO switch 88 is turned on, Step S140 determines whether or not a driving state is an economy driving state based on an ECO mode driving state determination map having a tendency not to regard the driving state as the economy driving state in comparison with a normal driving state determination map. A determination result of Step S140 is displayed on a meter display unit 90 in the form of an illumination or an extinction of an ECO mark 95 so as to inform the driving state is the economy driving state or not (Step S180).

11 Claims, 6 Drawing Sheets

(56) References Cited

U.S. PATENT DOCUMENTS

| | | | |
|---|---|---|---|
| 6,459,980 B1* | 10/2002 | Tabata et al. | 701/70 |
| 6,497,161 B2* | 12/2002 | Poljansek et al. | 74/335 |
| 6,549,840 B1* | 4/2003 | Mikami et al. | 701/69 |
| 6,580,973 B2* | 6/2003 | Leivian et al. | 701/1 |
| 6,600,413 B1* | 7/2003 | Lo | 340/439 |
| 6,719,076 B1* | 4/2004 | Tabata et al. | 180/65.7 |
| 6,792,344 B2* | 9/2004 | Minowa et al. | 701/96 |
| 6,832,148 B1* | 12/2004 | Bennett et al. | 701/54 |
| 7,013,205 B1* | 3/2006 | Hafner et al. | 701/22 |
| 7,177,743 B2* | 2/2007 | Roy | 701/36 |
| 7,512,477 B2* | 3/2009 | Quigley et al. | 701/103 |
| 7,537,293 B2* | 5/2009 | Lin et al. | 303/146 |
| 7,783,461 B2* | 8/2010 | Dato | 703/5 |
| 8,068,974 B2* | 11/2011 | Newhouse et al. | 701/123 |
| 2002/0062183 A1* | 5/2002 | Yamaguchi et al. | 701/22 |
| 2002/0143441 A1* | 10/2002 | Yamaguchi et al. | 701/22 |
| 2002/0165658 A1* | 11/2002 | Ament | 701/110 |
| 2004/0034460 A1* | 2/2004 | Folkerts et al. | 701/54 |
| 2004/0249533 A1* | 12/2004 | Wheals et al. | 701/36 |
| 2005/0080523 A1* | 4/2005 | Bennett et al. | 701/22 |
| 2005/0096804 A1* | 5/2005 | Gee et al. | 701/22 |
| 2005/0131588 A1* | 6/2005 | Kuge et al. | 701/1 |
| 2005/0247495 A1* | 11/2005 | Tabata et al. | 180/65.2 |
| 2005/0267663 A1* | 12/2005 | Naono et al. | 701/48 |
| 2005/0272555 A1* | 12/2005 | Tabata et al. | 477/2 |
| 2006/0064225 A1* | 3/2006 | Tabata et al. | 701/96 |
| 2006/0185917 A1* | 8/2006 | Ozeki et al. | 180/65.2 |
| 2006/0271269 A1* | 11/2006 | Stolle et al. | 701/106 |
| 2007/0203625 A1* | 8/2007 | Quigley et al. | 701/33 |
| 2007/0234843 A1* | 10/2007 | Knabe | 74/523 |
| 2007/0276582 A1* | 11/2007 | Coughlin | 701/123 |
| 2007/0287572 A1* | 12/2007 | Tabata et al. | 475/254 |
| 2007/0298928 A1* | 12/2007 | Yamanaka et al. | 477/15 |
| 2007/0299594 A1* | 12/2007 | Masuda et al. | 701/110 |
| 2008/0059035 A1* | 3/2008 | Siddiqui et al. | 701/93 |
| 2008/0097674 A1* | 4/2008 | Kuwahara et al. | 701/51 |
| 2010/0175936 A1* | 7/2010 | Schneider | 180/65.28 |
| 2011/0040435 A1* | 2/2011 | Gillecriosd | 701/22 |

FOREIGN PATENT DOCUMENTS

| | | |
|---|---|---|
| JP | 11-311332 A | 11/1999 |
| JP | 2001-231102 A | 8/2001 |
| JP | 2002-370560 A | 12/2002 |
| JP | 2003-220851 A | 8/2003 |
| JP | 2005-289183 A | 10/2005 |
| JP | 2005-337173 A | 12/2005 |
| JP | 2006-076415 A | 3/2006 |
| JP | 2006-151039 A | 6/2006 |
| JP | 2006-321466 A | 11/2006 |
| WO | 2005/082674 A1 | 9/2005 |

* cited by examiner

VEHICLE AND CONTROL METHOD THEREOF

TECHNICAL FIELD

The present invention relates to a vehicle having an informing unit capable of informing vehicle information that relates a driving state and a control method thereof.

BACKGROUND ART

Conventionally, there is well-known a vehicle including a display device disposed at a position easy to see for a driver, a driving state evaluating module that evaluates a present driving state from the view point of a economy driving, and a display control module that displays assist information for bringing the present driving state close to the economy driving state on the display device as necessary (for example, refer to Patent Document 1). In the vehicle, assist information includes at least one of a rotational speed, an accelerator opening, a vehicle speed and a shift position. Also, there is known a vehicle having a normal mode and an energy saving mode as operation modes and allowing drivers to freely select any one of the normal mode and the energy saving mode (for example, refer to Patent Document 2). With respect to the same predetermined output of an accelerator position sensor, in the vehicle, a supply of fuel to the internal combustion engine during selection of the energy saving mode is decreased in comparison with a supply of fuel during selection of the normal mode thereby improving fuel consumption during selection of the energy saving mode.
[Patent Document 1] Japanese Patent Laid-Open No. 2005-289183
[Patent Document 2] Japanese Patent Laid-Open No. 2006-151039

DISCLOSURE OF THE INVENTION

The technique of the Patent Document 1 may encourages drivers to achieve the economy driving. Accordingly, it may be possible to improve fuel consumption if the technique is applied to the vehicle of the Patent Document 2. However, there is room for improvement in an encouragement to achieve the economy driving for further improving fuel consumption in the vehicle allowing to freely select any one of the normal mode and the energy saving mode.

A Vehicle and a control method thereof according to the present invention has an object to effectively encourage drivers to achieve an economy driving so as to improve fuel consumption in a vehicle allowing drivers to select a fuel consumption priority mode.

The present invention accomplishes the demand mentioned above by the following configurations applied to a vehicle and a control method thereof.

A vehicle according to the present invention is a vehicle having an informing unit capable of informing vehicle information that relates a driving state, the vehicle including: a fuel consumption priority mode selection switch to select a fuel consumption priority mode that gives priority to fuel consumption; a driving state determination module that determines whether or not the driving state is an economy driving state based on a first determination criterion when the fuel consumption priority mode selection switch is turned off, the driving state determination module determining whether or not the driving state is the economy driving state based on a second determination criterion that has a tendency not to regard the driving state as the economy driving state in comparison with the first determination criterion when the fuel consumption priority mode selection switch is turned on; an informing control module that control the informing unit so that a driver is informed of a determination result of the driving state determination module.

The vehicle includes the driving state determination module that determines whether or not the driving state is the economy driving state. The driving state determination module performs the determination based on the first determination criterion when the fuel consumption priority mode selection switch is turned off, and performs the determination based on the second determination criterion that has a tendency not to regard the driving state as the economy driving state in comparison with the first determination criterion when the fuel consumption priority mode selection switch is turned on. Then, the informing unit informs the determination result of the driving state determination module so that the driver recognizes the determination. That is, in the vehicle, the determination criterion for the determination whether the driving state is the economy driving state becomes strict in comparison with the turn-off condition of the fuel consumption priority mode selection switch when it is turned on. Thus, the informing unit tends not to inform that the driving state is the economy driving state when the fuel consumption priority mode selection switch is turned on. Accordingly, in the vehicle, it is possible to effectively encourage the driver to achieve the economy driving so as to improve fuel consumption, especially when the fuel consumption priority mode selection switch is turned on.

The vehicle may further include a driving force related physical quantity acquisition unit that acquires a physical quantity relating a driving force demand by the driver, the first and second determination criteria may respectively regard that the driving state is the economy driving state when the acquired physical quantity is equal to or less than a predetermined threshold, and the threshold in the second determination criterion may be smaller than that in the first determination criterion. Thus, the informing unit does not principally inform that the driving state is the economy driving state unless a driving force demanded by the driver is relatively small when the fuel consumption priority mode selection switch is turned on. Accordingly, it is possible to encourage the driver not to demand an increase of the driving force more than necessary so as to improve fuel consumption. The physical quantity relating the driving force demand by the driver may be select from among an operation amount of an accelerator pedal, an intake air volume or a fuel injection amount relating the accelerator pedal operation and the driving force demand in itself.

The vehicle may further include a vehicle speed related physical quantity acquisition unit that acquires a physical quantity relating a vehicle speed, the first and second determination criteria may respectively regard that the driving state is the economy driving state when the acquired physical quantity is equal to or less than a predetermined vehicle speed related threshold, and the vehicle speed related threshold in the second determination criterion may be smaller than that in the first determination criterion. Thus, the informing unit does not principally inform that the driving state is the economy driving state unless the vehicle speed related physical quantity is relatively small when the fuel consumption priority mode selection switch is turned on. Accordingly, it is possible to encourage the driver not to increase the vehicle speed more than necessary so as to improve fuel consumption. The vehicle speed related physical quantity may be select from among the vehicle speed in itself and an acceleration that is a differential value of the vehicle speed.

The vehicle may further include a motor capable of outputting power for driving, and an accumulator capable of supplying and receiving electric power from the motor. The vehicle may further include an internal combustion engine capable of outputting power for driving, and a power transmitting mechanism having an axle-side rotational element connected to a predetermined axle, and an engine-side rotational element connected to an engine shaft of the internal combustion engine and configured to differentially rotate with respect to the axle-side rotational element, the power transmitting mechanism capable of outputting at least a part of power from the engine shaft to the axle side. The power transmitting mechanism may be an electric power-mechanical power input output structure connected to the predetermined axle and the engine shaft of the internal combustion engine and outputting at least a part of power from the internal combustion engine to the axle side with input/output of electric power and mechanical power. The electric power-mechanical power input output structure may include a power generation motor capable of inputting and outputting power, and a three shaft-type power input output assembly connected with three shafts, the predetermined axle, the engine shaft of the internal combustion engine, and a rotating shaft of the power generation motor, the three shaft-type power input output assembly configured to input and output power to one remaining shaft, based on input and output of powers from and to any two shafts selected among the three shafts. The power transmitting mechanism may be a continuously variable transmission.

A control method of a vehicle according to the present invention is a control method of a vehicle including an informing unit capable of informing vehicle information that relates a driving state, and a fuel consumption priority mode selection switch to select a fuel consumption priority mode that gives priority to fuel consumption, the method including the steps of:

(a) determining whether or not the driving state is an economy driving state based on a first determination criterion when the fuel consumption priority mode selection switch is turned off, the step (a) determining whether of not the driving state is the economy driving state based on a second determination criterion that has a tendency not to regard the driving state as the economy driving state in comparison with the first determination criterion when the fuel consumption priority mode selection switch is turned on; and (b) controlling the informing unit so that a driver is informed of a determination at the step (a).

According to the method, the determination criterion for the determination whether the driving state is the economy driving state becomes strict in comparison with the turn-off condition of the fuel consumption priority mode selection switch when it is turned on. Thus, the informing unit tends not to inform that the driving state is the economy driving state when the fuel consumption priority mode selection switch is turned on. Accordingly, it is possible to effectively encourage the driver to achieve an economy driving so as to improve fuel consumption when the fuel consumption priority mode selection switch is turned on.

The first and second determination criteria used at the step (a) may respectively regard that the driving state is the economy driving state when a physical quantity relating a driving force demand by the driver is equal to or less than a predetermined threshold, and the threshold in the second determination criterion may be smaller than that in the first determination criterion.

The first and second determination criteria used at the step (a) may respectively regard that the driving state is the economy driving state when a physical quantity relating a vehicle speed is equal to or less than a predetermined vehicle speed related threshold, and the vehicle speed related threshold in the second determination criterion may be smaller than that in the first determination criterion.

BEST MODES OF CARRYING OUT THE INVENTION

Now, the best mode for carrying out the present invention will be described with reference to an embodiment.

Figure 1:
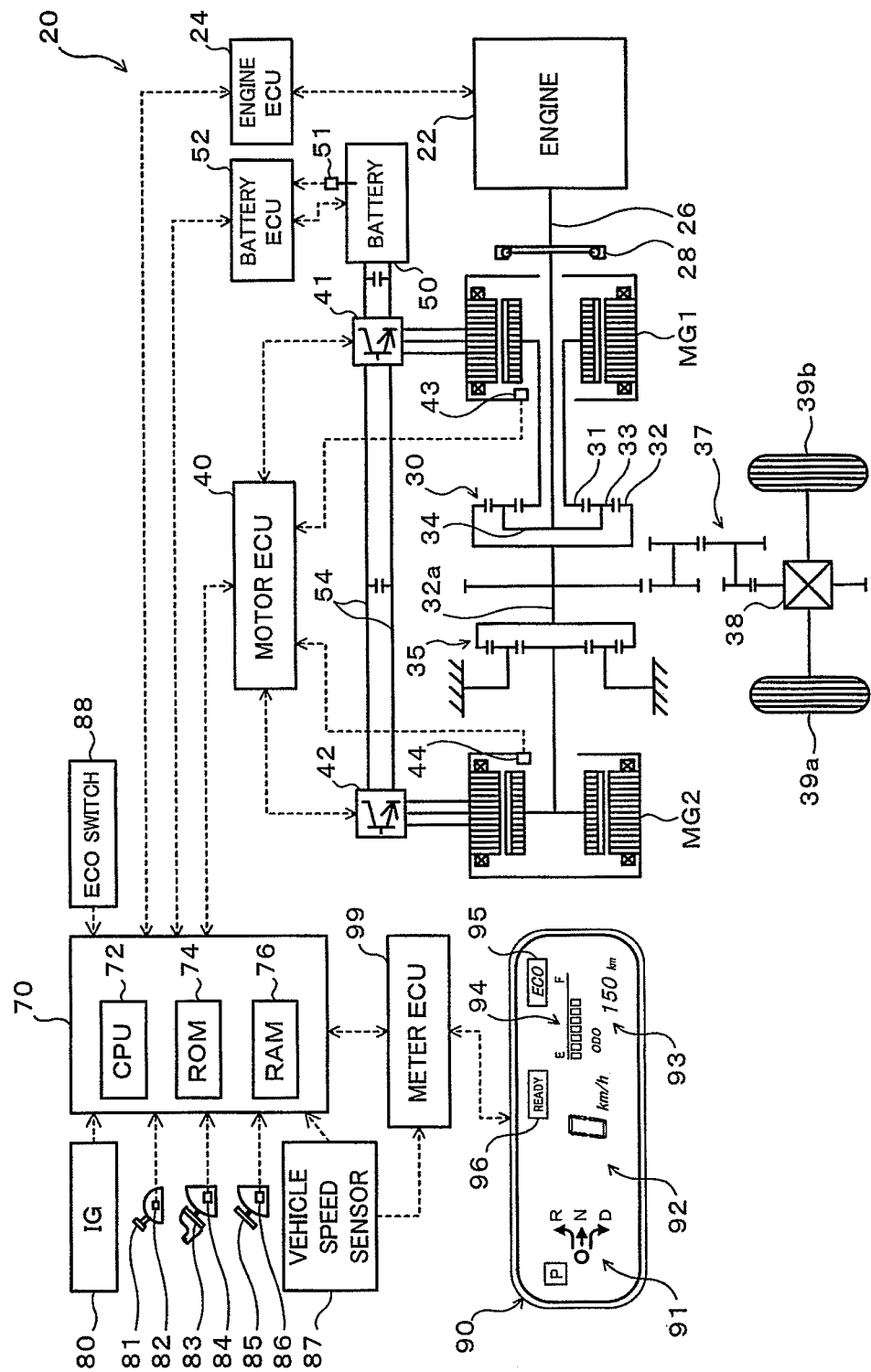
FIG. 1 is a schematic block diagram of a hybrid vehicle 20 according to an embodiment of the present invention.

FIG. 1 schematically illustrates the configuration of a hybrid vehicle 20 in one embodiment of the invention. The hybrid vehicle 20 of the illustrated configuration includes an engine 22, a three shaft-type power distribution integration mechanism 30 connected via a damper 28 to a crankshaft 26 or an output shaft of the engine 22, a motor MG1 connected to the power distribution integration mechanism 30 and designed to have power generation capability, a reduction gear 35 attached to a ring gear shaft 32a as an axle connected to the power distribution integration mechanism 30, a motor MG2 connected to the ring gear shaft 32a via the reduction gear 35, and a hybrid electronic control unit 70 (hereinafter referred to as "hybrid ECU") configured to control the operations of the whole hybrid vehicle 20.

The engine 22 is constructed as an internal combustion engine designed to consume a hydrocarbon fuel, such as gasoline or light oil, and thereby generate power. The engine 22 is under operation controls, such as fuel injection control, ignition timing control, and intake air flow control, of an engine electronic control unit 24 (hereinafter referred to as "engine ECU"). The engine ECU 24 inputs diverse signals from various sensors mounted on the engine 22 to measure and detect the operating conditions of the engine 22. The engine ECU 24 establishes communication with the hybrid ECU 70 to control the operations of the engine 22 in response to control signals from the hybrid ECU 70 and with reference to the diverse signals from the various sensors and to output data regarding the operating conditions of the engine 22 to the hybrid ECU 70 according to the requirements.

The power distribution integration mechanism 30 includes a sun gear 31 as an external gear, a ring gear 32 as an internal gear arranged concentrically with the sun gear 31, multiple pinion gears 33 arranged to engage with the sun gear 31 and with the ring gear 32, and a carrier 34 arranged to hold the multiple pinion gears 33 in such a manner as to allow both their revolutions and their rotations on their axes. The power distribution integration mechanism 30 is thus constructed as a planetary gear mechanism including the sun gear 31, the ring gear 32, and the carrier 34 as the rotational elements of differential motions. The carrier 34 as an engine-side rotational element, the sun gear 31, and the ring gear 32 as an axle-side rotational element in the power distribution integration mechanism 30 are respectively connected to the crankshaft 26 of the engine 22, to the motor MG1, and to the reduction gear 35 via the ring gear shaft 32a. When the motor MG1 functions as a generator, the power distribution integration mechanism 30 distributes the power of the engine 22 input via the carrier 34 into the sun gear 31 and the ring gear 32 corresponding to their gear ratio. When the motor MG1 functions as a motor, on the other hand, the power distribution integration mechanism 30 integrates the power of the engine 22 input via the carrier 34 with the power of the motor MG1 input via the sun gear 31 and outputs the integrated power to the ring gear 32. The power output to the ring gear 32 is transmitted from the ring gear shaft 32a through a gear mechanism 37 and a differential gear 38 and is eventually output to drive wheels 39a and 39b of the hybrid vehicle 20.

The motors MG1 and MG2 are constructed as known synchronous motor generators to enable operations as both a generator and a motor. The motors MG1 and MG2 receive and supply electric power to a battery 50 as a secondary cell via inverters 41 and 42. Power lines 54 connecting the battery 50 with the inverters 41 and 42 are structured as common positive bus and negative bus shared by the inverters 41 and 42. Such connection enables electric power generated by one of the motors MG1 and MG2 to be consumed by the other motor MG2 or MG1. The battery 50 may thus be charged with surplus electric power generated by either of the motors MG1 and MG2, while being discharged to supplement insufficient electric power. The battery 50 is neither charged nor discharged upon the balance of the input and output of electric powers between the motors MG1 and MG2. Both the motors MG1 and MG2 are driven and controlled by a motor electronic control unit 40 (hereinafter referred to as "motor ECU"). The motor ECU 40 inputs various signals required for driving and controlling the motors MG1 and MG2, for example, signals representing rotational positions of rotors in the motors MG1 and MG2 from rotational position detection sensors 43 and 44 and signals representing phase currents to be applied to the motors MG1 and MG2 from current sensors (not shown). The motor ECU 40 outputs switching control signals to the inverters 41 and 42. The motor ECU 40 also computes rotational speeds Nm1 and Nm2 of the rotors in the motors MG1 and MG2 according to a rotational speed computation routine (not shown) based on the output signals of the rotational position detection sensors 43 and 44. The motor ECU 40 establishes communication with the hybrid ECU 70 to drive and control the motors MG1 and MG2 in response to control signals received from the hybrid ECU 70 and to output data regarding the operating conditions of the motors MG1 and MG2 to the hybrid ECU 70 according to the requirements.

The battery 50 is under control and management of a battery electronic control unit 52 (hereinafter referred to as "battery ECU"). The battery ECU 52 inputs various signals required for management and control of the battery 50, for example, an inter-terminal voltage from a voltage sensor (not shown) located between terminals of the battery 50, a charge-discharge current from a current sensor (not shown) located in the power line 54 connecting with the output terminal of the battery 50, and a battery temperature Tb from a temperature sensor 51 attached to the battery 50. The battery ECU 52 outputs data regarding the operating conditions of the battery 50 by data communication to the hybrid ECU 70 and the engine ECU 24 according to the requirements. The battery ECU 52 also executes various arithmetic operations for management and control of the battery 50. A remaining capacity or state of charge SOC of the battery 50 is calculated from an integrated value of the charge-discharge current measured by the current sensor.

The hybrid ECU 70 is constructed as a microprocessor including a CPU 72, a ROM 74 configured to store processing programs, a RAM 76 configured to temporarily store data, input and output ports (not shown), and a communication port (not shown). The hybrid ECU 70 inputs, via its input port, an ignition signal from an ignition switch (start switch) 80, a shift position SP or a current setting position of a shift lever 81 from a shift position sensor 82, an accelerator opening Acc or the driver's depression amount of an accelerator pedal 83 from an accelerator pedal position sensor 84, a brake pedal stroke BS or the driver's depression amount of a brake pedal 85 from a brake pedal stroke sensor 86, and a vehicle speed V from a vehicle speed sensor 87. An ECO switch (fuel consumption priority mode selection switch) 88 for selecting, as a control mode at a time of driving, an ECO mode (fuel consumption priority mode) that gives priority to fuel consumption over drivability is disposed in the vicinity of the driver's seat of the hybrid vehicle 20 of the present embodiment. The ECO switch 88 is also connected to the hybrid ECU 70. When the ECO switch 88 is turned on by the driver or the like, a predetermined ECO flag Feco that is set to value "0" during normal operation (when the ECO switch 88 is turned off) is set to value "1", and the hybrid vehicle 20 is controlled according to various control procedures that are previously defined to give priority to efficiency. As described above, the hybrid ECU 70 is connected via the communication port with the engine ECU 24, the motor ECU 40, the battery ECU 52, and the like, and exchanges various control signals and data with the engine ECU 24, the motor ECU 40, the battery ECU 52, and the like.

As shown in FIG. 1, a meter display unit 90 as an informing unit is disposed in the vicinity of the driver's seat of the hybrid vehicle 20. In the embodiment, the meter display unit 90 is constructed of a LCD panel and includes a shift position display portion 91 for displaying the shift position SP detected by the shift position sensor 82, a speed meter 92 for displaying the vehicle speed V detected by the vehicle speed sensor 87, an odometer 93 for displaying an integrated value of a driving distance, a fuel level gage 94 for displaying a remaining amount in a fuel tank (not shown), a display portion of an ECO mark 95 that is illuminated when a driving state of the hybrid vehicle 20 is an economy driving state satisfactorily enabling fuel consumption saving, a display portion of a READY mark 96 that is illuminated when the hybrid vehicle 20 is in an drivable state, and the like. The meter display unit 90 is controlled by a meter electronic control unit (hereinafter referred to as "mater ECU") 99 that establishes communication with the hybrid ECU 70 and the like and exchanges necessary data the hybrid ECU 70 and the like.

The hybrid vehicle 20 of the embodiment constructed as described above sets a torque demand, which is to be output to the ring gear shaft 32a or the driveshaft linked with an axle of the hybrid vehicle 20, based on the vehicle speed V and the accelerator opening Acc corresponding to the driver's depression amount of the accelerator pedal 83, and controls the operations of the engine 22, the motors MG1 and MG2 to ensure output of power equivalent to the set torque demand to the ring gear shaft 32a. There are several drive control modes of the engine 22, the motors MG1 and MG2. In a torque conversion drive mode, while the engine 22 is driven and controlled to ensure output of the power equivalent to the torque demand, the motors MG1 and MG2 are driven and controlled to enable all the output power of the engine 22 to be subjected to torque conversion by the power distribution integration mechanism 30, the motors MG1 and MG2 and to be output to the ring gear shaft 32a. In a charge-discharge drive mode, the engine 22 is driven and controlled to ensure output of power corresponding to the sum of a power demand and electric power required for charging the battery 50 or electric power to be discharged from the battery 50. The motors MG1 and MG2 are driven and controlled to enable all or part of the output power of the engine 22 with charge or discharge of the battery 50 to be subjected to torque conversion by the power distribution integration mechanism 30, the motors MG1 and MG2 and to ensure output of the power demand to the ring gear shaft 32a. In a motor drive mode, the motor MG2 is driven and controlled to ensure output of power equivalent to the power demand to the ring gear shaft 32a, while the engine 22 stops its operation.

Figure 2:
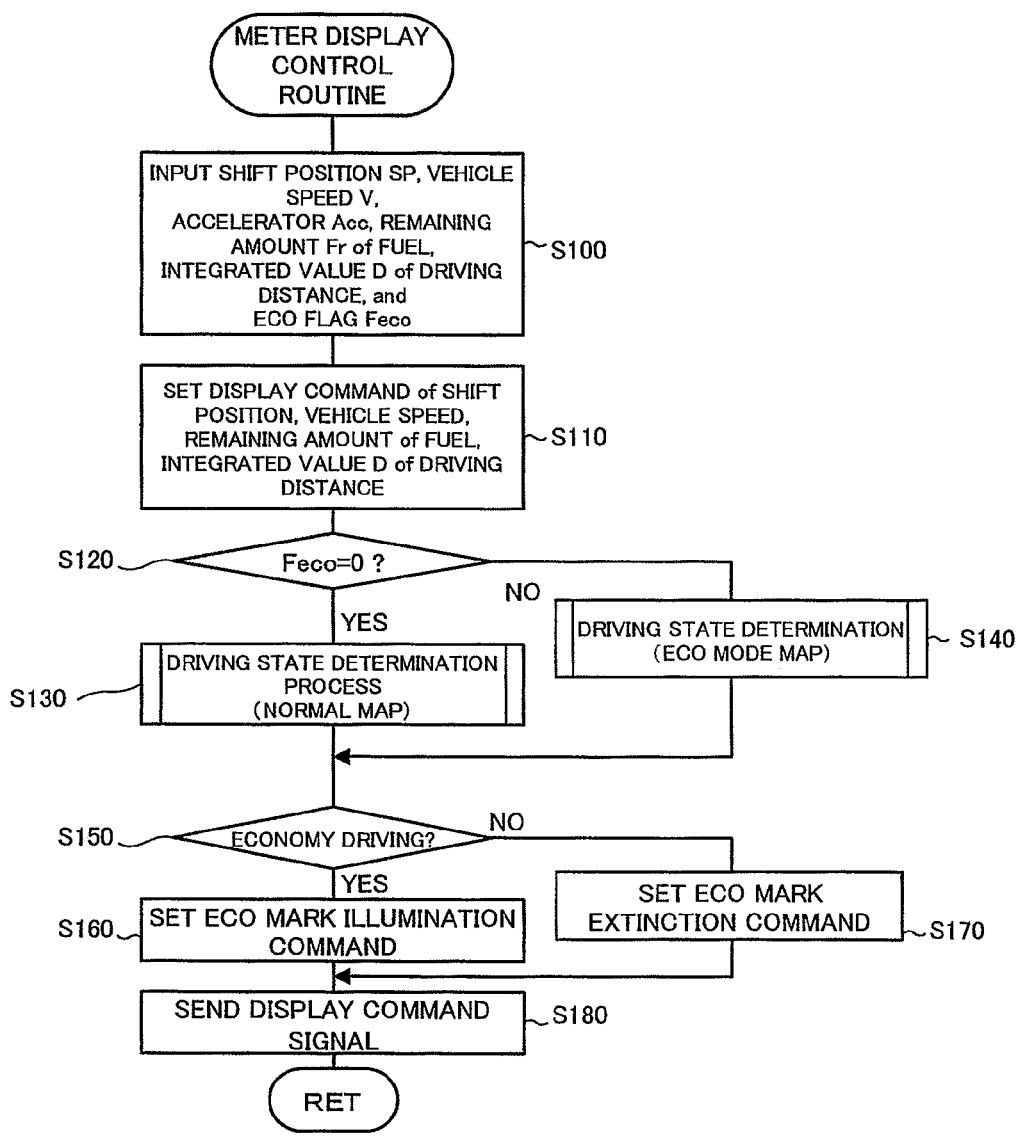
FIG. 2 is a flowchart illustrating an example of a meter display control routine executed by a meter electric control unit 99 of the embodiment.

Next, a control procedure of the meter display unit included in the hybrid vehicle 20 with the above configuration will be described. FIG. 2 is a flowchart illustrating an example of a meter display control routine that is executed by the meter ECU 99 at predetermined time intervals (for example, at every several msec).

At start of the meter display control routine in FIG. 2, the CPU (not shown) of the meter ECU 99 executes input processing of data required for the control such as the shift position SP that is an operation position of the shift lever 81, the vehicle speed V from the vehicle speed sensor 87, the accelerator opening Acc that is a depression amount of the accelerator pedal 83, the remaining amount Fr of the fuel in the fuel tank, the integrated value D of the driving distance, and a value of the ECO flag Feco (Step S100). The CPU inputs the shift position SP detected by the shift position sensor 82, the accelerator opening Acc detected by the accelerator pedal position sensor 84, and the value of the ECO flag Feco set by the hybrid ECU 70 from the hybrid ECU 70 by communication. The remaining amount Fr of the fuel is derived from a predetermined storage area of the meter ECU 99 that separately calculates the remaining amount Fr based on a fuel remaining amount signal from a fuel sender gage (not shown), the vehicle speed and the like to store the remaining amount Fr on the storage area. The integrated value D of the driving distance is derived from a predetermined storage area of the meter ECU 99 that separately calculates the integrated value D based on the vehicle speed and the like to store the integrated value D on the storage area. Then, the CPU sets display commands for displaying the input shift position SP, the input vehicle speed V, the input remaining amount Fr, and the input integrated value D of the driving distance on the shift position display portion 91, the speed meter 92, the odometer 93, and the fuel level gage 94 of the meter display unit 90 respectively (Step S110).

Then, the CPU determines whether or not the input ECO flag Feco is value "0", that is, whether or not the ECO switch 88 is turned off (Step S120). When the ECO switch 88 is turned off and the value of the ECO flag Feco is value "0", the CPU executes a driving state determination based on the vehicle speed V and the accelerator opening Acc input at Step S100 and a normal driving state determination map (see a solid line in FIG. 3) as a first determination criterion (Step S130). When the ECO switch 88 is turned on and the value of the ECO flag Feco is value "1", the CPU executes a driving state determination based on the vehicle speed V and the accelerator opening Acc input at Step S100 and an ECO mode driving state determination map (see a broken line in FIG. 3) as a first determination criterion (Step S140).

Figure 3:
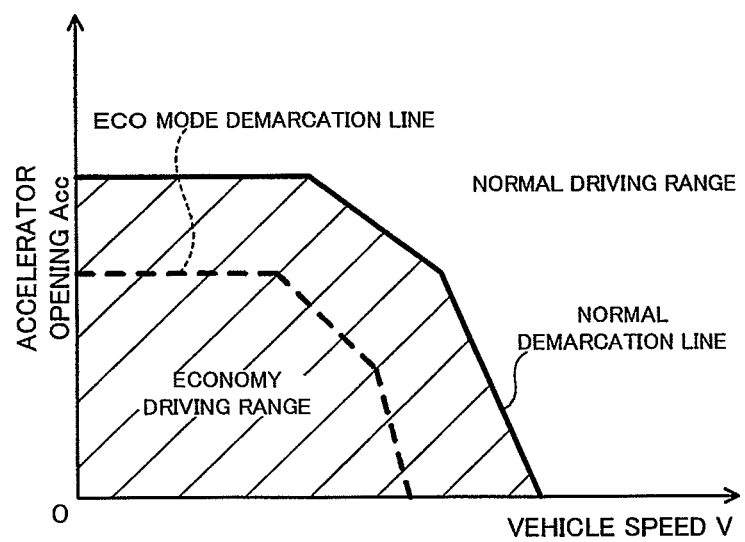
FIG. 3 is a view exemplifying a normal driving state determination map and an ECO mode driving state determination map.

The normal driving state determination map and the ECO mode driving state determination map respectively define an upper limit of the vehicle speed V when the driving state of the hybrid vehicle 20 is the economy driving state, and an upper limit of the accelerator opening Acc for each vehicle speed. The normal driving state determination map and the ECO mode driving state determination map are previously stored in a ROM (not shown) of the meter ECU 99. In the embodiment, the normal driving state determination map for the turn-off condition of the ECO switch 88 is prepared through experiments and analyses so as to improve fuel consumption as much as possible while ensuring driving performance such as a response to a driving force demand by the driver and an acceleration performance. The normal driving state determination map defines a range enclosed with a normal demarcation line indicated with the solid line in FIG. 3, a horizontal axis (vehicle speed axis) and a vertical axis (accelerator opening axis) as the economy driving range. The driving state determination of Step S130 determines whether or not the economy driving range defined by the normal driving state determination map includes a point corresponding to the vehicle speed V and the accelerator opening Acc input at Step S100. On the other hand, the ECO mode driving state determination map for the turn-on condition of the ECO switch 88 is prepared through experiments and analyses while giving priority to the fuel consumption rather than the driving performance. The ECO mode driving state determination map defines a range enclosed with an ECO mode demarcation line indicated with the broken line in FIG. 3, a horizontal axis (vehicle speed axis) and a vertical axis (accelerator opening axis) as the economy driving range. The driving state determination of Step S140 determines whether or not the economy driving range defined by the ECO mode driving state determination map includes a point corresponding to the vehicle speed V and the accelerator opening Acc input at Step S100. As shown in FIG. 3, the ECO mode driving state determination map is prepared to define both the upper limit of the vehicle speed and the upper limit of the accelerator opening Acc for each vehicle speed to be small in comparison with the normal driving state determination map and to have a tendency not to regard the driving state as the economy driving state. That is, the economy driving range defined by the ECO mode driving state determination map is narrower than that defined by the normal driving state determination map, so that the determination criterion for the determination whether the driving state is the economy driving state becomes strict in comparison with the turn-off condition of the fuel consumption priority mode selection switch when it is turned on.

After the driving state determination of Step S130 or S140, the CPU checks a result of the driving state determination (Step S150). When the current driving state is the economy driving state, the CPU set an ECO mark illumination command indicating that the ECO mark is to be illuminated (Step S160). When the current driving state is not the economy driving state, the CPU set an ECO mark extinction command indicating that the ECO mark is to be extinguished (Step S170). The CPU sends display command set at Step S110 and Step S160 or S170 to the meter ECU 99 so as to display the shift position SP, vehicle speed V, the remaining amount Fr of the fuel, and the integrated value D of the driving distance on the meter display unit 90 and illuminate or extinguish the ECU mark 95. Then, the CPU returns to Step S100 to repeat the processing of and after Step S100.

As has been described above, the hybrid vehicle 20 of the embodiment determines whether or not the driving state is the economy driving state based on the normal driving state determination map when the ECO switch 88 is turned off (Step S130). When the ECO switch 88 is turned on, the hybrid vehicle 20 determines whether or not the driving state is the economy driving state based on the ECO mode driving state determination map having the tendency not to regard the driving state as the economy driving state in comparison with the normal driving state determination map (Step S140). Then, the determination result of Step S130 or S140 is displayed on the meter display unit 90 in the form of the illumination or the extinction of an ECO mark 95 so as to inform the driving state is the economy driving state or not as well as vehicle information such as the shift position SP, vehicle speed V, the remaining amount Fr of the fuel, and the integrated value D of the driving distance. That is, in the hybrid vehicle 20, the determination criterion for the determination whether the driving state is the economy driving state becomes strict in comparison with the turn-off condition of the ECO switch 88 when it is turned on. Thus, the meter display unit 90 tends not to display that the driving state is the economy driving state when the ECO switch 88 is turned on. Accordingly, in the hybrid vehicle 20, it is possible to effectively encourage the driver to achieve the economy driving so as to improve fuel consumption when the ECO switch 88 is turned on.

In the hybrid vehicle 20, the normal driving state determination map and the ECO mode driving state determination map are respectively prepared to regard the driving state as the economy driving state when the accelerator opening Acc that is a physical quantity relating the driving force demand by the driver is equal to or less than the upper limit (threshold) of each vehicle speed V. Further, the ECO mode driving state determination map is prepared to define the upper limit of the accelerator opening Acc for each vehicle speed V to be small in comparison with the normal driving state determination map (see FIG. 3). Accordingly, the ECO mark 95 is not principally illuminated to indicate that the driving state is not the economy driving state unless the accelerator opening Acc by the driver (torque demand required by the driver) is relatively small when the ECO switch 88 is turned on. Thus, in the hybrid vehicle 20, it is possible to encourage the driver not to depress the accelerator pedal 83 (not to demand an increase of the driving force) more than necessary so as to further improve fuel consumption. In other word, the normal driving state determination map and the ECO mode driving state determination map are respectively prepared to regard the driving state as the economy driving state when the vehicle speed V is equal to or less than the upper limit (vehicle speed threshold) of the vehicle speed V for each accelerator opening Acc, and the ECO mode driving state determination map is prepared to define the upper limit of the vehicle speed V for each accelerator opening Acc to be small in comparison with the normal driving state determination map (see FIG. 3). Accordingly, the ECO mark 95 is not principally illuminated to indicate that the driving state is not the economy driving state unless the vehicle speed V is relatively low when the ECO switch 88 is turned on. Thus, in the hybrid vehicle 20, it is possible to encourage the driver not to increase the vehicle speed V more than necessary so as to further improve fuel consumption.

In the embodiment, the normal driving state determination map and the ECO mode driving state determination map are respectively prepared to define the relationship between the vehicle speed V, the accelerator opening Acc and the driving state for the determination whether or not the driving state is the economy driving state, however, they are not limited to this. In stead of the accelerator opening Acc, it is possible to use other parameters as physical quantities relating the driving force demand by the driver such as the torque demand or a power demand required by the driver. Further, instead of the vehicle speed V, it is possible to use an acceleration as a vehicle speed related physical quantity relating the vehicle speed.

The normal driving state determination map and the ECO mode driving state determination map may define a relationship between the physical quantity relating the driving force demand such as the accelerator opening Acc and the driving state, or a relationship between the vehicle speed related physical quantity relating the vehicle speed such as the vehicle speed V and the driving state. In stead of a visual sense, the determination result of the determination whether or not the driving state is the economy driving state may be informed of the driver through an auditory sense or five sense except the visual and auditory senses.

Figure 4:
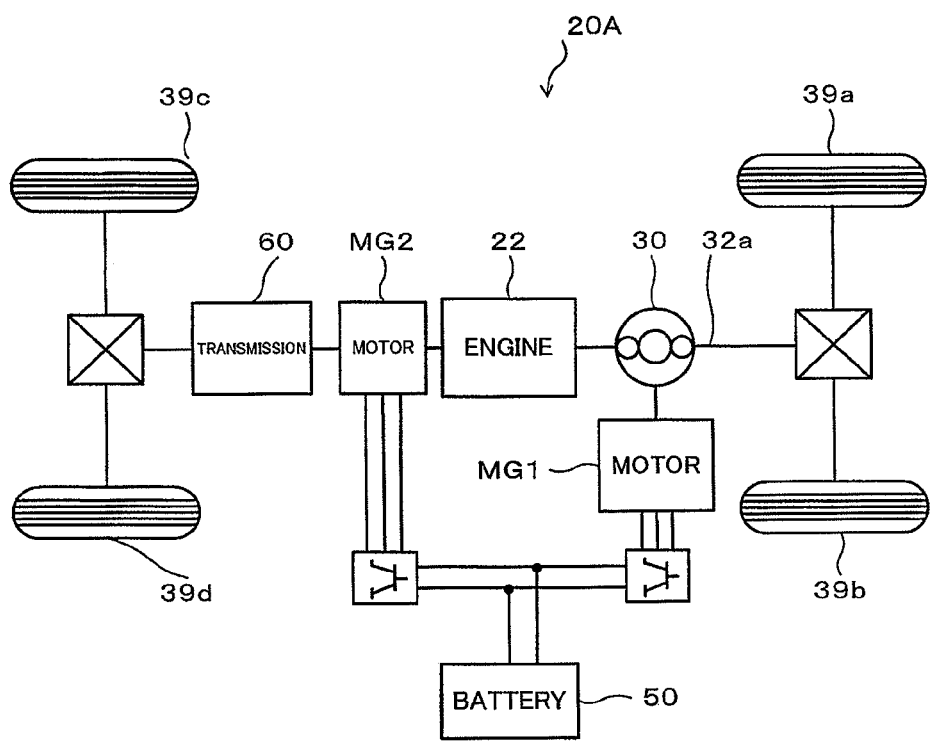
FIG. 4 is a schematic block diagram of a hybrid vehicle 20A according to a modification of the present invention.
Figure 5:
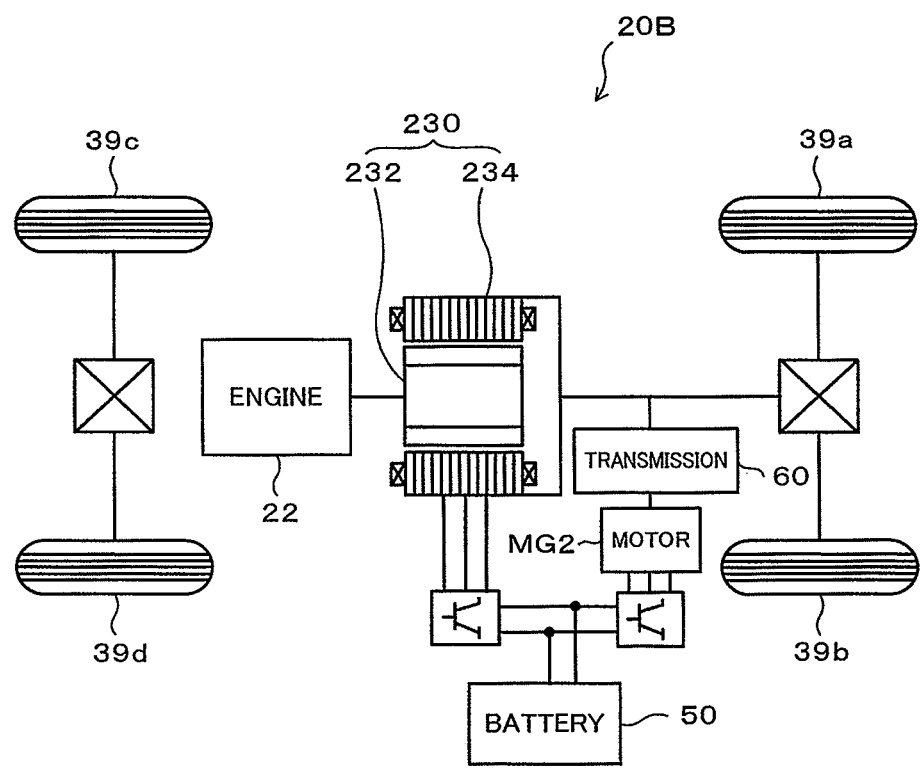
FIG. 5 is a schematic block diagram of a hybrid vehicle 20B according to a further modification of the present invention.

The present invention can be naturally applied to a conventional vehicle that does not include a motor and the like. In such a case, it is possible to use an intake air volume or a fuel injection amount relating the accelerator pedal operation as the physical quantity relating the driving force demand except for the operation amount of the accelerator pedal. Although the hybrid vehicle 20 of the above described embodiment is a vehicle that outputs the power of the motor MG2 to an axle connected to the ring gear shaft 32*a*, an object for application of the present invention is not limited thereto. More specifically, as in the case of a hybrid vehicle 20A as a modification example shown in FIG. 4, the present invention may also be applied to a vehicle in which the power of the motor MG2 is output to an axle (axle connected to wheels 39*c* and 39*d* in FIG. 4) that is different from the axle (axle to which the wheels 39*a* and 39*b* are connected) that is connected to the ring gear shaft 32*a*. Further, although the hybrid vehicle 20 of the above described embodiment is a vehicle that outputs the power of the engine 22 to the ring gear shaft 32*a* as an axle connected to the wheels 39*a* and 39*b* via the power distribution and integration mechanism 30, an object for application of the present invention is not limited thereto. More specifically, as in the case of a hybrid vehicle 20B as a modification example shown in FIG. 5, the present invention may also be applied to a vehicle that includes a pair-rotor motor 230 that has an inner rotor 232 connected to the crankshaft of the engine 22, and an outer rotor 234 connected to the axle that outputs the power to the wheels 39*a* and 39*b* and that transmits a part of the power output from the engine 22 to the axle while converting the remainder of the power into electric power.

Figure 6:
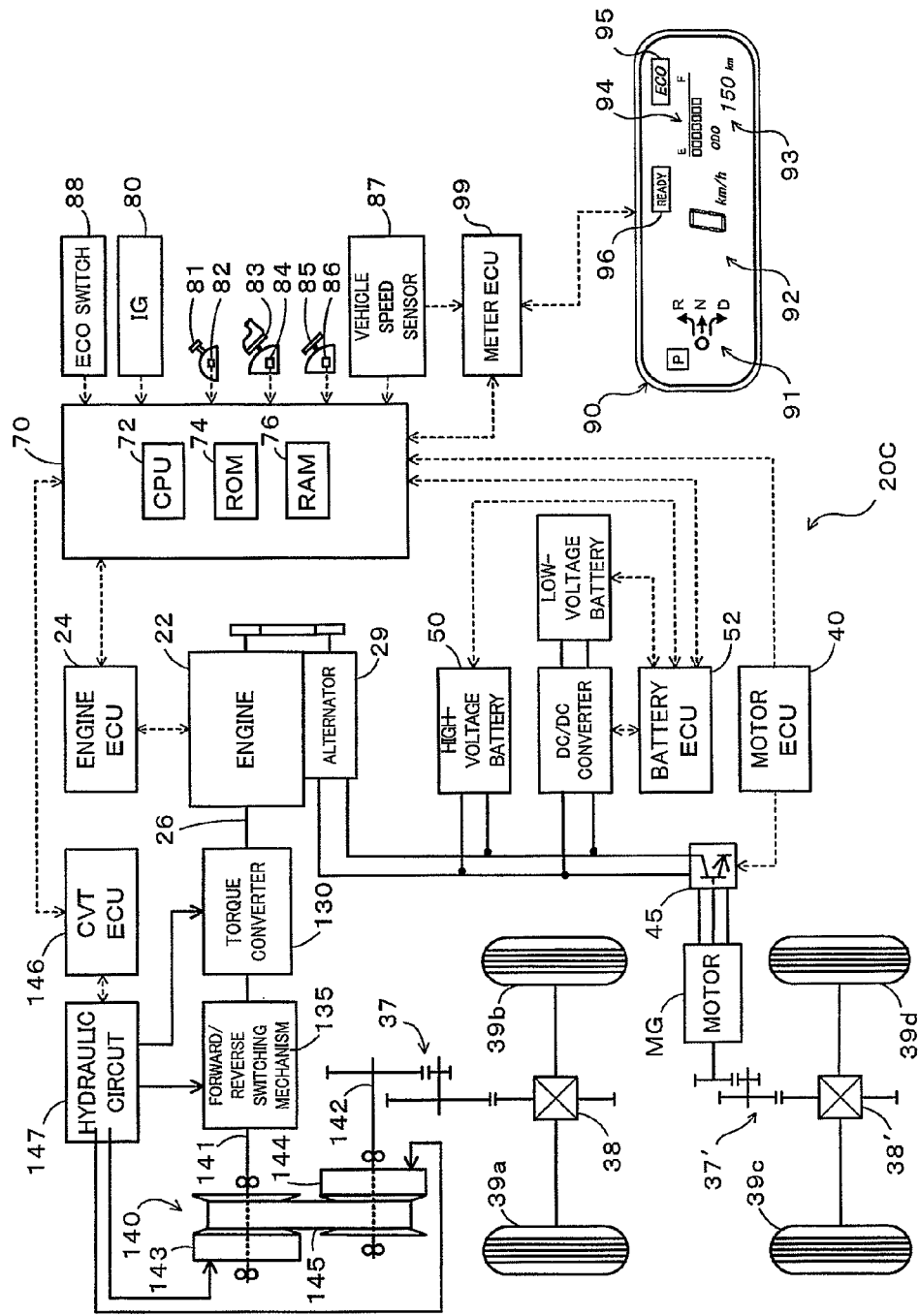
FIG. 6 is a schematic block diagram of a hybrid vehicle 20C according to a still further modification of the present invention.

The present invention may also be applied to a vehicle that includes a continuously variable transmission (hereinafter, referred to as "CVT") as a power transmitting mechanism that transmits the power from the engine 22 to the axle side instead of the power distribution and integration mechanism 30 in the hybrid vehicle 20 that has the ring gear 32 as the axle-side rotational element and the carrier 34 as the engine-side rotational element. A hybrid vehicle 200 that is one example of this kind of vehicle is illustrated in FIG. 6. The hybrid vehicle 20C as a modification example shown in FIG. 6 includes a front-wheel drive system that outputs the power from the engine 22 to, for example, wheels 39*a* and 39*b* that are front wheels via a torque converter 130, a forward/reverse switching mechanism 135, a belt-type CVT 140, a gear mechanism 37, a differential gear 38, and the like; a rear-wheel drive system that outputs power from a motor MG that is a synchronous motor generator to, for example, wheels 39*c* and 39*d* that are rear wheels via a gear mechanism 37', a differential gear 38' and the like; and a hybrid ECU 70 that controls the whole vehicle. In this case, the torque converter 130 is configured as a fluid-type torque converter that has a lock-up mechanism. Further, the forward/reverse switching mechanism 135 includes, for example, a double-pinion planetary gear mechanism, a brake and a clutch. The forward/reverse switching mechanism 135 performs switching between forward and reverse movement and connection/disconnection of the torque converter 130 and the CVT 140. The CVT 140 has a primary pulley 143 capable of changing a groove width that is connected to an input shaft 141 as an engine-side rotational element, a secondary pulley 144 that is similarly capable of changing a groove width and is connected to an output shaft 142 as an axle-side rotational element, and a belt 145 that is wound around the primary pulley 143 and the secondary pulley 144. By changing the groove width of the primary pulley 143 and the secondary pulley 144 by means of hydraulic oil from a hydraulic circuit 147 that is driven and controlled by a CVT electronic control unit 146, the CVT 140 continuously changes the speed of the power input to the input shaft 141 and outputs the resulting power to the output shaft 142. Further, a toroidal-type CVT may be applied to the hybrid vehicle 20C. The motor MG is connected to an alternator 29 that is driven by the engine 22 via an inverter 45, and is connected to a battery (high-voltage battery) 50 having an output terminal connected to a power line from the alternator 29. Thus, the motor MG is driven by power from the alternator 29 or the battery 50, and performs regeneration to charge the battery 50 with electric power that is generated thereby. In the hybrid vehicle 20C constructed above, the determination criterion for the determination whether the driving state is the economy driving state becomes strict in comparison with the turn-off condition of the ECO switch 88 when it is turned on. Thus, the meter display unit 90 tends not to display that the driving state is the economy driving state when the ECO switch 88 is turned on. Accordingly, in the hybrid vehicle 20C, it is possible to effectively encourage the driver to achieve the economy driving so as to improve fuel consumption when the ECO switch 88 is turned on.

The correlation between the principal elements of the embodiments and modification examples, and the principal elements of the invention described in the "Disclosure of the Invention" section will now be described. That is, in the above described embodiment and modification examples, the ECO switch 88 to select the ECO mode giving priority to fuel consumption rather than the drivability corresponds to "fuel consumption priority mode selection switch", the meter ECU 99 executing the meter display control routine shown in FIG. 3 corresponds to "driving state determination module", and "informing control module", the accelerator pedal position sensor 84 corresponds to "driving force related physical quantity acquisition unit" and the vehicle speed sensor 87 corresponds to "vehicle speed related physical quantity acquisition unit". Further, the motors MG and MG2 correspond to "motor", the battery 50 corresponds to "accumulator", the power distribution integration mechanism 30 including the ring gear 32 as the axle-side rotational element and the carrier 34 as the engine-side rotational element, the CVT 140 including the input shaft 141 as the engine-side rotational element and the output shaft 142 as the axle-side rotational element, and the pair-rotor motor 230 correspond to "power transmitting mechanism", a combination of the motor MG1 and the power distribution integration mechanism 30, and the pair-rotor motor 230 correspond to "electric power-mechanical power input output structure", the motor MG1, the alternator 29 and the pair-rotor motor 230 correspond to "power generation motor", and the power distribution integration mechanism 30 corresponds to "three shaft-type power input output assembly". In any case, the correspondence between the main elements in the embodiment and the variant and the main elements in the invention described in "Disclosure of the Invention" do not limit the elements in the invention described in "Disclosure of the Invention" since the embodiment is an example for describing in detail the best mode for carrying out the invention described in "Disclosure of the Invention". Specifically, the embodiment is merely a detailed example of the invention described in "Disclosure of the Invention", and the invention described in "Disclosure of the Invention" should be construed on the basis of the description therein.

Hereinbefore, the embodiments of the present invention have been described with reference to drawings, however, the present invention is not limited to the above embodiments. It will be apparent that various modifications can be made to the present invention without departing from the spirit and scope of the present invention.

INDUSTRIAL APPLICABILITY

The technique of the invention is preferably applied to the manufacturing industries of vehicles.

The invention claimed is:

1. A vehicle having an informing unit configured to inform vehicle information that relates a driving state, the vehicle comprising:
    a fuel consumption priority mode selection switch to select a fuel consumption priority mode that gives priority to fuel consumption;
    a driving state determination module configured to determine whether the driving state is an economy driving state based on a first determination criterion when the fuel consumption priority mode selection switch is turned off, the driving state determination module determining whether the driving state is the economy driving state based on a second determination criterion that is stricter for determining whether the driving state is the economy driving state in comparison with the first determination criterion, when the fuel consumption priority mode selection switch is turned on;
    an informing control module configured to control the informing unit to inform a driver of a determination result of the driving state determination module.

2. A vehicle according to claim 1, further comprising a driving force related physical quantity acquisition unit that acquires a physical quantity relating a driving force demand by the driver,
    wherein the first and second determination criteria respectively regard that the driving state is the economy driving state when the acquired physical quantity is equal to or less than a predetermined threshold, and wherein the threshold in the second determination criterion is smaller than that in the first determination criterion.

3. A vehicle according to claim 1, further comprising a vehicle speed related physical quantity acquisition unit that acquires a physical quantity relating a vehicle speed,
    wherein the first and second determination criteria respectively regard that the driving state is the economy driving state when the acquired physical quantity is equal to or less than a predetermined vehicle speed related threshold, and wherein the vehicle speed related threshold in the second determination criterion is smaller than that in the first determination criterion.

4. A vehicle according to claim 1, further comprising:
    a motor capable of outputting power for driving; and an accumulator capable of supplying and receiving electric power from the motor.

5. A vehicle according to claim 1, further comprising:
an internal combustion engine capable of outputting power for driving; and
a power transmitting mechanism having an axle-side rotational element connected to a predetermined axle, and an engine-side rotational element connected to an engine shaft of the internal combustion engine and configured to differentially rotate with respect to the axle-side rotational element, the power transmitting mechanism capable of outputting at least a part of power from the engine shaft to the axle side.

6. A vehicle according to claim 5, wherein the power transmitting mechanism is an electric power-mechanical power input output structure connected to the predetermined axle and the engine shaft of the internal combustion engine and outputting at least a part of power from the internal combustion engine to the axle side with input/output of electric power and mechanical power.

7. A vehicle according to claim 6, wherein the electric power-mechanical power input output structure includes a power generation motor capable of inputting and outputting power, and a three shaft-type power input output assembly connected with three shafts, the predetermined axle, the engine shaft of the internal combustion engine, and a rotating shaft of the power generation motor, the three shaft-type power input output assembly configured to input and output power to one remaining shaft, based on input and output of powers from and to any two shafts selected among the three shafts.

8. A vehicle according to claim 5, wherein the power transmitting mechanism is a continuously variable transmission.

9. A control method of a vehicle including an informing unit configured to inform vehicle information that relates a driving state, and a fuel consumption priority mode selection switch to select a fuel consumption priority mode that gives priority to fuel consumption, the method comprising the steps of:
(a) determining whether the driving state is an economy driving state based on a first determination criterion when the fuel consumption priority mode selection switch is turned off, the step (a) determining whether the driving state is the economy driving state based on a second determination criterion that is stricter for determining whether the driving state is the economy driving state in comparison with the first determination criterion, when the fuel consumption priority mode selection switch is turned on; and
(b) controlling the informing unit so that a driver is informed of a determination at the step (a).

10. A control method of a vehicle according to claim 9, wherein the first and second determination criteria used at the step (a) respectively regard that the driving state is the economy driving state when a physical quantity relating a driving force demand by the driver is equal to or less than a predetermined threshold, and wherein the threshold in the second determination criterion is smaller than that in the first determination criterion.

11. A control method of a vehicle according to claim 9, wherein the first and second determination criteria used at the step (a) respectively regard that the driving state is the economy driving state when a physical quantity relating a vehicle speed is equal to or less than a predetermined vehicle speed related threshold, and wherein the vehicle speed related threshold in the second determination criterion is smaller than that in the first determination criterion.

* * * * *